United States Patent [19]

Tremaglio et al.

[11] Patent Number: 5,105,925
[45] Date of Patent: Apr. 21, 1992

[54] STOP SPINDLE ATTACHMENT FOR AUTOMATIC SWISS SCREW MACHINES

[76] Inventors: Neil L. Tremaglio, 505 Three Mile Hill Rd., Middlebury, Conn. 06762; Angelo F. Tremaglio, 101 Southgate Rd.; Caesar D. Tremaglio, 73 Camp Field Rd., both of Waterbury, Conn. 06708; Lawrence E. Rode, Ridge Rd., Terryville, Conn. 06786; Alfred R. Smith, 32 Goodwin St., Bristol, Conn. 06010

[21] Appl. No.: 618,615

[22] Filed: Nov. 27, 1990

[51] Int. Cl.⁵ .................. F16D 13/76; F16D 67/00
[52] U.S. Cl. .......................... 192/11; 474/110
[58] Field of Search ............... 192/11; 82/142; 474/110, 117, 135

[56] References Cited

U.S. PATENT DOCUMENTS

| | | | |
|---|---|---|---|
| 694,211 | 2/1902 | Souhami | 474/110 |
| 2,157,892 | 5/1939 | Godfriaux | 82/142 |
| 3,978,693 | 9/1976 | Worst | 474/110 |
| 4,283,182 | 8/1981 | Kraft | 474/110 |

Primary Examiner—Leslie A. Braun
Assistant Examiner—Andrea Pitts
Attorney, Agent, or Firm—Sherman & Shalloway

[57] ABSTRACT

A spindle brake apparatus for add on attachment to automatic Swiss screw machines, comprising an idler pulley release assembly, a spindle brake assembly and a cam actuated control assembly employing the existing cam shaft timing and control means of such machines to stop spindle rotation so that cross milling operations may be performed. The apparatus is operated by compressed air in response to cam actuated valves to first release an idler pulley then apply the brake to stop spindle rotation. After a stationary operation is performed, compressed air is released thereby releasing the brake followed by reengagement of the idler pulley to reestablish spindle rotation.

14 Claims, 4 Drawing Sheets

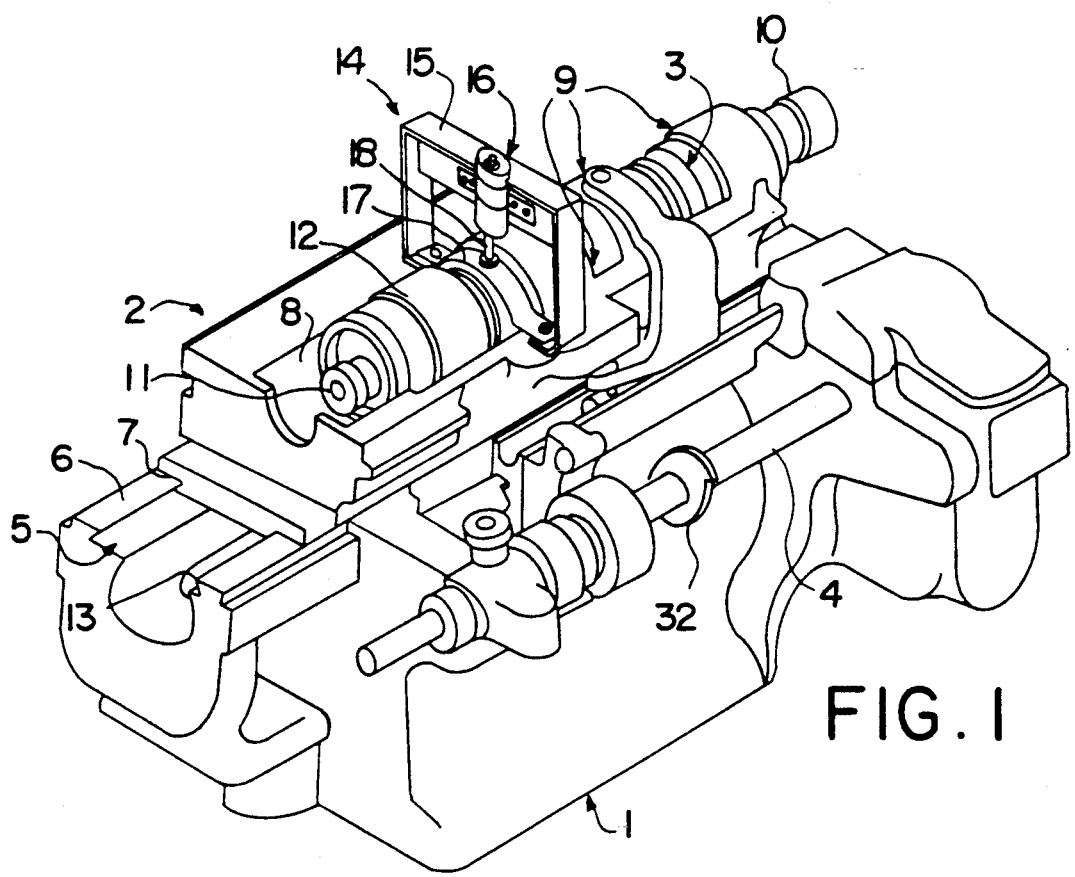
FIG. 1
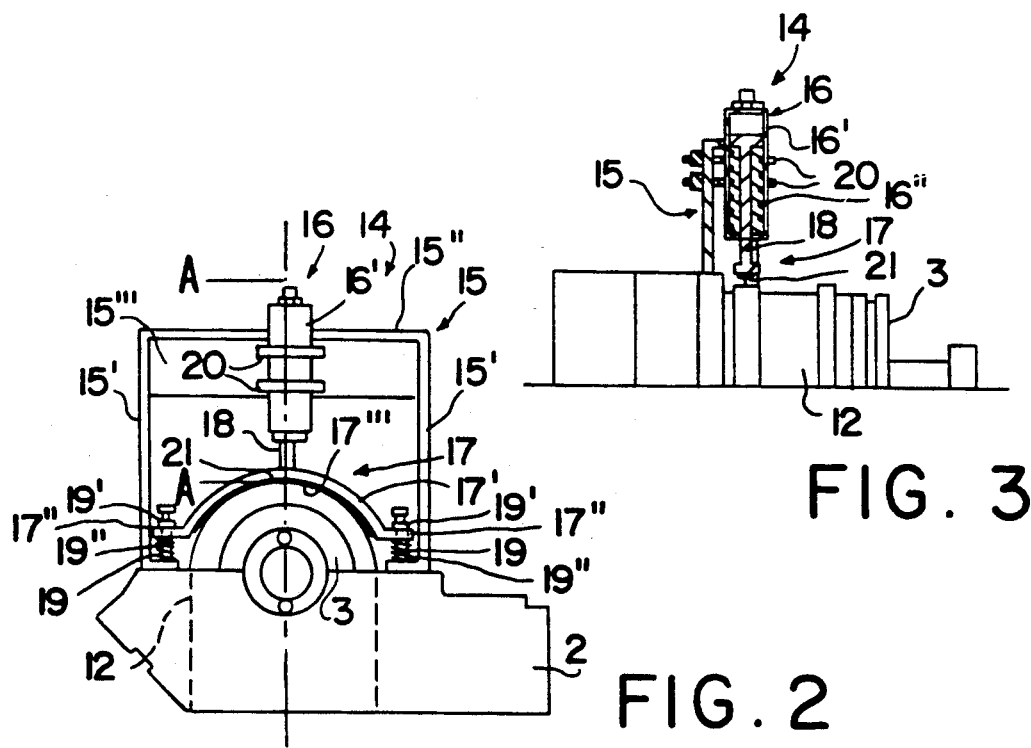
FIG. 2
FIG. 3

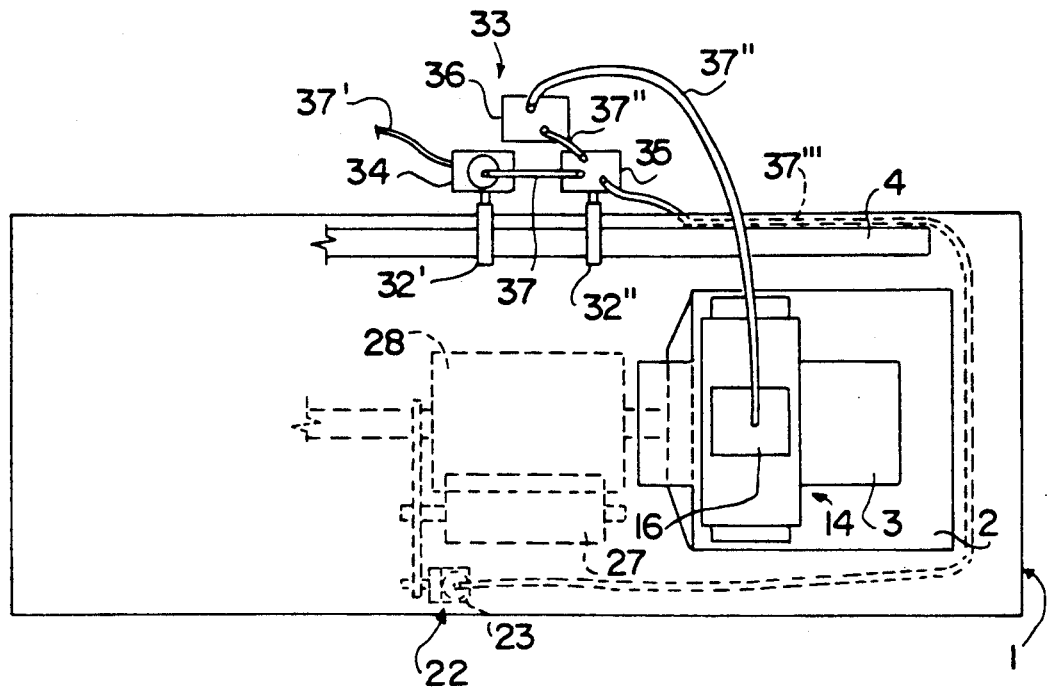
FIG. 7
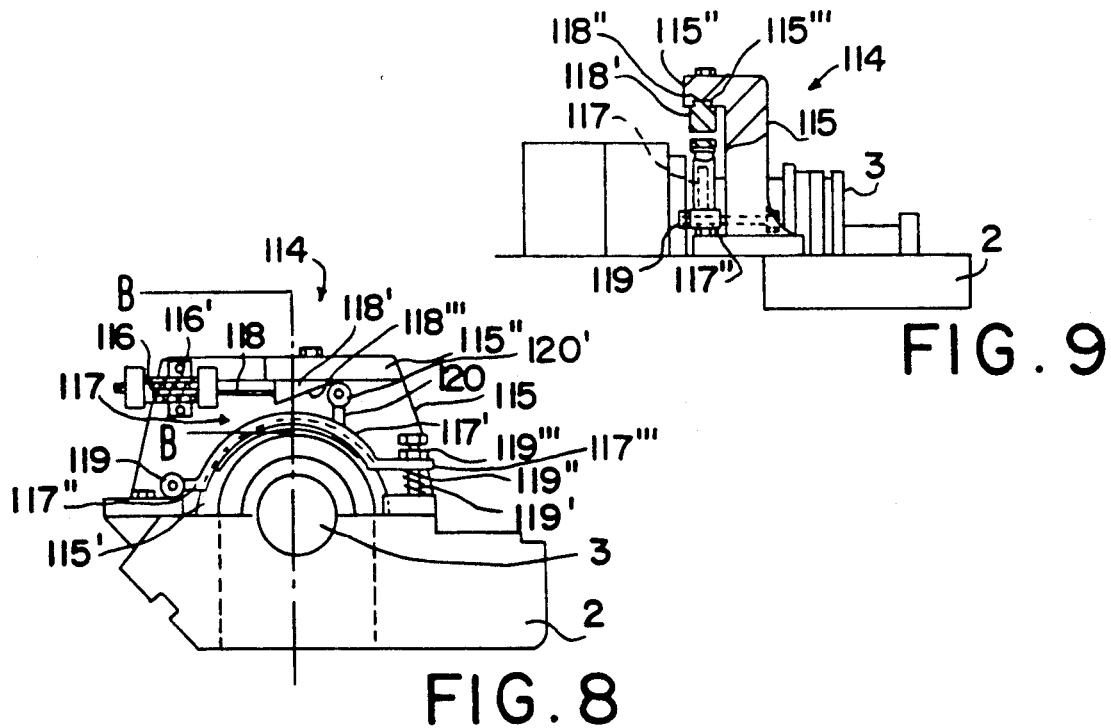
FIG. 9
FIG. 8

STOP SPINDLE ATTACHMENT FOR AUTOMATIC SWISS SCREW MACHINES

BACKGROUND OF THE INVENTION

Field of The Invention

Automatic Swiss screw machines are metal working lathes whose automatic operation is obtained by a camshaft which controls the succession of productive operations and idle periods and the movements of all working parts. The cams may be changed or adjusted and, once set, such machines are automatic, producing a series of identical parts from a piece of bar stock.

Traditionally, these machines are limited to performing operations that require the work to be rotating, such rotation being applied by the headstock spindle within which the work is held. In order to perform operations in which the work is "stationary, such as cross drilling or the like, it has been necessary to remove the part from the screw machine and take it to another machine for the stationary operation. Alternatively, the spindle rotation must be stopped and the screw machine provided with the necessary tools to perform the stationary operation.

Stopping the spindle rotation is necessary to avoid breakage of cross milling tools and drills. Also, it is necessary in some cases to be able to properly position the operation performed by the stationary tool. Furthermore, in the case of fine tolerance parts, the rotary positioning of the work must be accomplished with accuracy so that the site of the stationary operation is precisely located.

Although newer models of these machines have means for stopping the spindles built in or available as an additional option, the mechanisms of these devices involve a complex assembly of clutches and bearings within the machines. Such assemblies require the services of an experienced mechanic to set and maintain them and are not adaptable to other types of machines or indeed to the large established base of older machines that are in current and daily use.

Recognizing the need for a simple apparatus, easily adaptable to existing automatic Swiss screw machines, the inventors herein have devised such an apparatus, comprising essentially three parts, that is simple to set up and use yet provides positive and accurate control over the rotation of the screw machine spindle.

SUMMARY OF THE INVENTION

The apparatus comprises three basic parts to be installed on cam controlled automatic Swiss screw machines. An idler pulley release assembly is installed beneath the machine to provide automatic engagement and disengagement of the idler pulley of the drive mechanism with the main drive belt. A brake assembly is installed over the spindle to provide control over rotation of the spindle. And, a cam actuated air flow control valve assembly is installed in proximity to the cam shaft of the Swiss screw machine so that a cam on the shaft can actuate the valve assembly at the appropriate times during the milling operations performed by the Swiss screw machine.

The cam shaft is an existing part of automatic Swiss screw machines and is the main control mechanism for all operations performed. When the machine is running, the cam shaft is driven at a specific rate so that cams installed thereon rotate, their lobes engaging actuating means for the different milling tools installed on the machine. The cams are arranged so that the tools are actuated at specific times to perform their particular operations on the rotating stock. These cams may be changed depending on the particular tool to be used or operation to be performed, thereby permitting the machine to be easily set up to perform operations necessary to make different items from the rotating stock.

By using the already existing control means of the machine and a cam actuated control valve, the inventors herein have overcome the need for a complicated gear and clutch mechanism such as has been employed on other machines to obtain the same result. Furthermore, use of the existing cam shaft enables the present device to be easily set up to stop the spindle rotation at any point in the sequence of operations to be performed.

The present invention also employs air pressure to actuate the idler release assembly and the brake assembly, further simplifying the overall apparatus and making it easier to install on and adapt to the existing population of automatic Swiss screw machines. The compressed air is easily supplied from a tank at each machine or from a main compressor serving a shop with multiple machines. The use of compressed air as the driving fluid further eliminates the need for added gears, belts clutches or the like to provide control over the idler pulley and spindle.

Alternatively, the actuating means of the idler release assembly and the spindle brake assembly, instead of being operated by compressed air via the cam actuated air flow control valve, may employ electrical solenoid units triggered by a switch actuated by the cam.

Accordingly, it is an object of this invention to provide an add-on apparatus for automatic Swiss screw machines to control spindle rotation.

It is a further object to provide such an apparatus that is simple to set up and use and provides accurate control over the spindle rotation.

It is a still further object to provide such an apparatus that may be easily and readily adapted to existing automatic Swiss screw machines.

Further objects will be evident from the following description and drawings.

BRIEF DESCRIPTION OF THE DRAWING FIGURES

FIG. 1 is a perspective view of the spindle head portion of an automatic Swiss screw machine showing the brake assembly in place.

FIG. 2 is an end view of the sliding spindle head of an automatic Swiss screw machine showing the brake assembly in place.

FIG. 3 is a partial cross section of the assembly of FIG. 2 taken along line A—A.

FIG. 7 is a representation of an automatic Swiss screw machine with stop spindle apparatus installed, illustrating the relationship of the pneumatic embodiment parts.

FIG. 8 is an end view of the sliding spindle head of an automatic Swiss screw machine illustrating an alternative brake assembly in place.

FIG. 9 is a partial cross section of the assembly of FIG. 8 taken along line B—B.

DETAILED DESCRIPTION OF THE INVENTION

Figure 4:
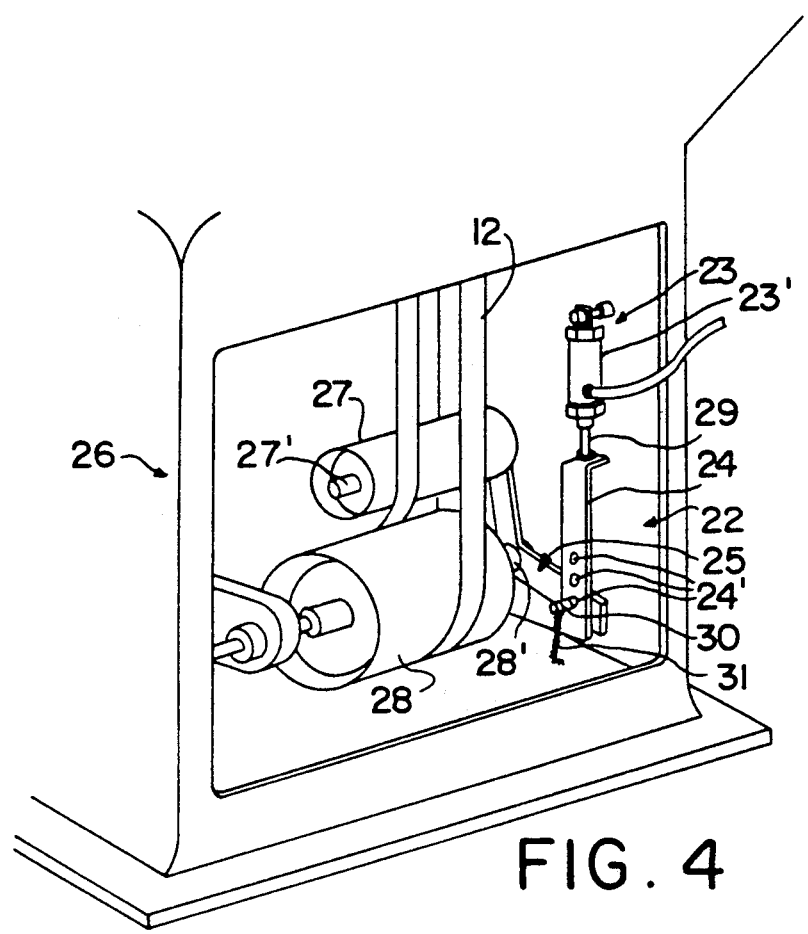
FIG. 4 is a perspective view of the drive mechanism of an automatic Swiss screw machine showing the idler pulley release assembly.

FIG. 1 shows the main head and spindle portion of an automatic Swiss screw machine which comprises main body casting 1, sliding head 2, spindle 3 and cam shaft 4. The main body 1 has a track 5 on which the sliding head 2 travels. Cooperating dovetails 6 and 7 of track 5 and sliding head 2 keep the two pieces together. The upper surface of head 2 is provided with a longitudinal cavity 8 in which is held spindle 3. Appropriate bearing means 9 are provided to both hold spindle 3 in place longitudinally within head cavity 8 and to allow rotation of spindle 3 about its longitudinal axis. Spindle 3 includes a collet and chuck 10 to hold stock material on which work is to be performed, the stock usually being elongated bar stock that passes through a central longitudinal bore 11 of spindle 3. Swiss screw machines typically include means to progressively advance the stock through the spindle as operations are performed. However, such means are well known on these machines and do not form a part of the present invention and are, therefore, not shown.

Also not shown, but a standard part of Swiss screw machines, is the tool head. This part is positioned forward of collet and chuck 10 and groups tools around the work. The tool head includes actuators to bring the tools into position with the stock when different operations are to be performed, these actuators being operated by cams mounted on the cam shaft 4 which also extends forward along side the tool head. As with the stock advancing means, the tool head assembly does not form a specific part of this invention and is, therefore, not shown.

Returning to the sliding head 2 and spindle 3 assembly, rotation of the spindle is provided by a endless drive belt 12 extending upward from the pulley mechanism as shown in FIG. 4, through the body 1 and sliding head 2. An aperture is provided at the bottom of head cavity 8 to allow passage of belt 12 and an elongated slot 13 is provided at the bottom of track 5 allowing passage of belt 12 during longitudinal sliding of the head 2.

As FIG. 1 shows, brake assembly 14 is positioned over spindle 3 and is attached to head 2 so as to move with head 2 and spindle 3. Brake assembly 14 comprises brake frame 15 that securely attaches to the upper surface of head 2 and to which is secured brake actuator 16. Brake shoe 17 is secured to one end of actuator piston 18, the other end of which is within the body of brake actuator 16. In the embodiment of brake assembly 14 shown in FIG. 1, and more clearly in FIGS. 2 and 3, brake shoe 17 comprises arcuate central portion 17' having flange ends 17". These ends 17" are adapted to ride freely on brake assembly attachment bolts 19 which also serve to attach brake frame 15 to head 2. Brake frame 15 is a substantially U-shape element having legs 15' and cross-piece 15". Reinforcing flange 15''' is securely welded between legs 15' and along cross-piece 15" with the separation of legs 15' being sufficient to allow their positioning on either side of spindle 3, cross-piece 15" spanning the distance therebetween. Brake actuator 16 is secured to cross-piece 15" and reinforcement 15''' by appropriate means, the present embodiment being illustrated using U-bolts 20 passing around brake actuator 16 and through reinforcement 15''' for this purpose. Other means such as welding or a bolted or riveted strap may also be used. Preferably, brake shoe 17 is provided on its concave face 17'''' with a replaceable friction material 21 that contacts spindle 3 when the brake assembly 14 is actuated. Brake assembly attachment bolts 19 include upper stops 19' that limit the upward travel of brake shoe 17 when brake assembly 14 is disengaged. Springs 19", preferably of steel and encircling brake assembly attachment bolts 19 between brake shoe end flanges 17" and head 2 provide sufficient upward bias to brake shoe 17 to disengage it from spindle 3 when brake actuator 16 is deactivated.

Preferably, brake actuator 16 is a pneumatic cylinder 16' with piston 18 captured therein; one end of piston 18 extends downward and is attached to brake shoe 17. Brake actuator 16 is positioned with its longitudinal axis vertical so that, when compressed air is introduced, piston 18 and brake shoe 17 will be forced downward against the bias of springs 19" to bring friction material facing 21 on concave brake shoe surface 17'''' into contact with spindle 3 with sufficient force to stop rotation of spindle 3. Upon release of air pressure within cylinder 16', compressed springs 19" force brake shoe 17 and piston 18 upward away from contact with spindle 3, allowing spindle 3 to resume rotation. In addition, spring 16" within cylinder 16' is compressed when brake assembly 14 is actuated and serves to help retract piston 18 when air pressure is released.

An alternative brake assembly 114 is depicted in FIGS. 8 and 9, that of FIG. 9 being a partial cross section taken along line B—B of FIG. 8. This alternative assembly 114 occupies the same location on spindle head 2 relative to spindle 3 as the embodiment illustrated in FIGS. 1-3.

Alternative brake assembly 114 comprises brake frame portion shaped to fit over spindle 3, an arcuate cavity 115' being formed therein to span spindle 3. Along the top of frame 115 and extending laterally therefrom is track portion 115" which is provided with a dovetail groove 115''' in which wedge 118, fits and slides by virtue of a cooperating dovetail 118". Secured to frame 115 horizontally relative to track portion 115" is actuator cylinder 116 which corresponds to actuator cylinder 16 of brake assembly 14. Piston 118 corresponds to piston 18, the other end being attached to the base of wedge 118'. Brake shoe 117 comprises arcuate central portion 117' and flange ends 117" and 117'''. Flange end 117" is attached to frame 115 by means of bolt 119 so as to be able to pivot about that point. Flange end 117''' is adapted to ride freely on vertical bolt 119' which forms part of the attachment of brake assembly 114 to spindle head 2. Spring 119" preferably of steel, encircles bolt 119' between flange end 117''' and the footing of frame 115 to provide an upwardly biasing force sufficient to force brake shoe 117 away from spindle 3 when brake assembly 114 is deactivated. An upper stop 119''' restricts the upward movement of brake shoe 117.

Attached to and extending upward from arcuate portion 117' of brake shoe 117 is arm 120 bearing roller 120'. When air is supplied to cylinder 116 forcing piston 118 outward, wedge 118' is forced against roller 120' which rides against the inclined face 118''' of wedge 118, and is thereby pushed downward. This, in turn, forces brake shoe 117 downward against spindle 3 to exert braking action. Upon release of air pressure within cylinder 116, compressed spring 119'' pushes brake shoe 117 upward releasing braking action. A compressible spring member 116'' within cylinder 116, corresponding to spring member 16'' within cylinder 16 of assembly 14, forces piston 118 and wedge 118' back, further allowing brake shoe 117 to rise.

Figure 5:
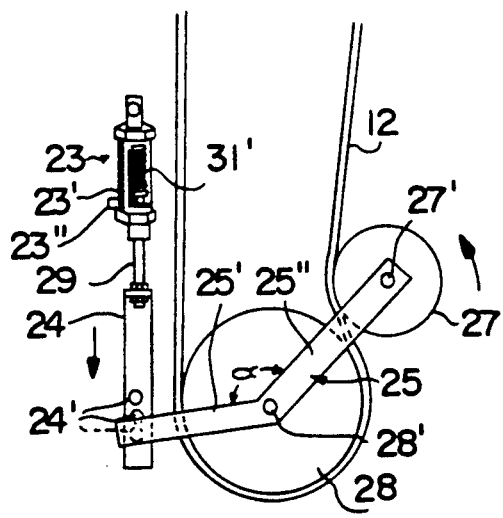
FIG. 5 is an end view of the idler release assembly and drive the idler pulley engaged.
Figure 6:
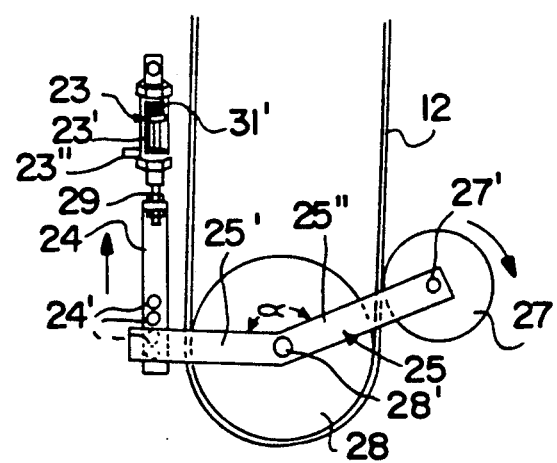
FIG. 6 is an end view of the idler release assembly and drive mechanism showing the idler pulley disengaged.

Concurrent with the operation of brake assembly 14 or 114 is the actuation of idler pulley release assembly 22. As shown in FIGS. 4, 5 and 6, this assembly comprises idler actuator 23, connection bar 24 and idler pivot arm 25. The assembly 22 is located within a support base cabinet 26 of a typical automatic Swiss screw machine and operates to engage and disengage idler pulley 27 and belt 12.

In the normal operation of automatic Swiss screw machines, drive belt 12 is driven by drive pulley 28, that pulley being itself driven by a prime mover or the like. Idler pulley 27 normally functions to maintain proper tension on belt 12 so that rotation of drive pulley 28 is transferred to spindle 3. However, before brake assembly 14 or 114 can be actuated to stop spindle rotation, drive force to spindle 3 must be stopped. Accordingly, idler pulley release assembly 22 is actuated to disengage idler pulley 27 from belt 12 thereby reducing tension on belt 12 allowing it to come loose around drive pulley 28 so at drive pulley 28 slips relative to belt 12. In this manner no drive force is transmitted by belt 12 to spindle 3 but the main drive motor of the automatic Swiss screw machine continues to run and provide power for other operations including rotation of cam shaft 4.

In the idler pulley release assembly 22, idler actuator 23 preferably comprises a pneumatic cyclinder 23', secured to an inner side wall of the support base cabinet 26 and having piston 29 captured therein; one end of piston 29 extends downward and attaches to one end of connection bar 24. The connection bar 24 is sufficiently secure such that longitudinal travel of piston 29 is directly transmitted to connection bar 24. The opposite end of connection bar 24 attaches by adjustable pivoting means to one end of idler pivot arm 25, the other end of pivot arm 25 being attached to and supporting idler pulley 27 by idler pulley shaft 27'. Idler pivot arm 25 pivots about the axle 28' of drive pulley 28 and comprises two portions 25' and 25'' disposed relative to each other about drive pulley axle 28' at an angle alpha of from 90° to 180°. This angle will vary depending on the particular pulley assembly of an automatic Swiss screw machine, but will preferably be from 125° to 145°.

The attachment of connection bar 24 to the outer end of portion 25' of idler pivot bar 25 is preferably adjustable allowing proper tension on drive belt 12 by idler pulley 27 to be achieved. One form of attachment is shown in FIGS. 4-6 and comprises a plurality of holes 24, along the longitudinal axis of a portion of bar 24 and a pin 30 attached near the outer end of portion 25' of idler pivot arm 25. Pin 30 is sized to fit through holes 24' and is long enough to prevent inadvertent separation of bar 24 and arm 25. For safety, a cotter pin or the like may be applied to pin 30 after assembly to prevent separation.

Operation of idler pulley release assembly 22 occurs in conjunction with spindle brake assembly 14 to release drive belt 12 before brake shoe 17 contacts spindle 3.

Referring to FIGS. 5 and 6, the normal position of idler pulley release assembly 22 components is shown in FIG. 5. Cylinder 23' is not pressurized and piston 29 is fully extended, pushing connection bar 24 and the outer end of portion 25' of idler pivot arm 25 downward. Idler pivot arm 25 is pivoted about drive pulley axle 28' thereby raising the outer end of portion 25'' of pivot arm 25. Since idler pulley shaft 27' is attached to the outer end of portion 25'', idler pulley 27 is raised into position to contact and deflect drive belt 12 placing it under tension about drive pulley 28 so that drive force is conveyed via belt 12 from drive pulley 28 to spindle 3.

When it is desired to stop spindle rotation, the drive must be disengaged before spindle brake assembly 14 or 114 is actuated. FIG. 6 shows the position of the idler pulley release assembly elements in the disengaged position. To do this, compressed air is admitted to cylinder 23' through nipple 23'' forcing piston 29 to retract, thereby pulling connection rod 24 and the outer end of portion 25' of idler pivot arm 25 upward. Idler pivot arm 25 pivots about drive pulley axle 28' lowering the outer end of portion 25'' and the attached idler pulley shaft 27'. This action disengages idler pulley 27 from drive belt 12, thereby removing the tension on belt 12 allowing it to slacken about drive pulley 28 sufficiently such that drive pulley 28 slips inside the loop of drive belt 12, with the result that no drive force is transmitted via belt 12 to spindle 3 and spindle brake assembly 14 may then be applied to stop spindle rotation.

Once the operation requiring stopping of the spindle is performed, spindle brake assembly 14 is released and idler pulley release assembly 22 is returned to the position shown in FIG. 5, thereby reengaging the drive belt 12. Return to this position is achieved by releasing the compressed air from cylinder 23', a biasing means being employed to positively urge the elements to the engaged position. As shown in FIGS. 5 and 6, such biasing means may be a spring means 31, within cylinder 23' that is of sufficient strength to urge and hold the elements in the engaged position, yet capable of being overcome by compressed air to pivot the idler pulley to the disengaged position. Alternatively, the biasing means may be located between connection arm 24 and a point within support base 26, for example between pin 30 and a point on the floor 26' of support base 26 as shown in FIG. 4 at 31''.

Control over the operation of both spindle brake assembly 14 and idler pulley release assembly 22 is by way of cam shaft 4 on an automatic Swiss screw machine. Cam shaft 4 is driven by the main drive source of the machine and controls all cutting operations conducted. Accordingly, rather than devise a complex control means, inventors herein have employed cam shaft 4 to control operation of the stop spindle device of this invention in a manner that makes it extremely simple to adjust and set up for virtually any sequence of stopping and starting of spindle rotation.

Such regulation is achieved by adding at least one cam 3 to cam shaft 4, this cam 32 being of such design and located on shaft 4 at a rotational position relative to the tool actuating cams normally present on such machines to actuate the stop spindle mechanism at the appropriate time for the particular operation to be performed.

FIG. 7 is a representation of an automatic screw machine with the stop spindle apparatus in place. Elements of the screw machine and the stop spindle apparatus of the invention are illustrated in block, with those parts inside the support base of the machine represented by broken lines. Parts of the Swiss screw machine not germane to or forming a part of this invention have been omitted for clarity.

In FIG. 7, brake assembly 14 is in place on spindle head 2 and straddles spindle 3. Cam shaft 4 extends along side and bears cams 32' and 32". Beneath main body casting 1 are located drive pulley 28 and idler pulley 27 and idler pulley release assembly 22. Associated with cam shaft 4 and cams 32' and 32" is control assembly 33. This assembly is preferably secured by appropriate means to main body casting 1 or to the upper edge of support base cabinet 26 in such proximity to cam shaft 4 so as to be actuated by cams 32' and 32", as they rotate on cam shaft 4 in time with other control cams that actuate the tools on the tool head (not shown).

Control assembly 33 comprises main air flow control valve 34, air flow partitioning valve 35 and air flow regulation valve 36. Splitting control of air flow in this manner provides extra safety to the apparatus; however, it is conceived that the operations of valves 34, 35 and 36 may alternatively be combined into two or even one multi-function valve actuated by one cam. The valves, brake actuators 16 and idler actuator 23 are connected by air tubes 37 conveying air flow in response to valve actuation.

Main control valve 34 controls air flow from an air tank or compressor via tube 37' to the assembly in response to triggering by rotation of cam 32' such that the cam lobe causes valve 34 to open. Air admitted to the assembly by valve 34 passes to partitioning valve 35 and from there to brake assembly 14 or 114 via tube 37" and to idler release assembly 22 via tube 37'". Partitioning valve 35 controls the timing of establishment and cut off of air flow to brake assembly 14 or 114 and idler release assembly 22 so that they are activated and deactivated in the correct sequence. When the stop spindle apparatus of this invention is used, it is important that idler pulley 27 be released before brake 17 or 117 is applied and that brake 17 or 117 be released before idler pulley 27 is reengaged. Partitioning valve 35 performs this control function in response to actuation by cam 32" allowing air flow into tube 37'" before tube 37" and stopping air flow to tube 37" before tube 37'". In this manner, the correct sequence of engagement and disengagement of brake assembly 14 or 14 and idler pulley release assembly 22 is achieved. Regulation valve 36 is a safety valve to prevent actuation of brake assembly 14 or 114 in the event air pressure is sensed as being too high, which would indicate that idler pulley release had not occurred.

In an alternative embodiment the functions of main air flow control valve 34 and partitioning valve 35 may be combined into one valve, in which case only one cam would be needed. Additionally, air flow regulation valve 36 or an equivalent sensing means may also be incorporated as a part of a combined valve assembly.

Figure 10:
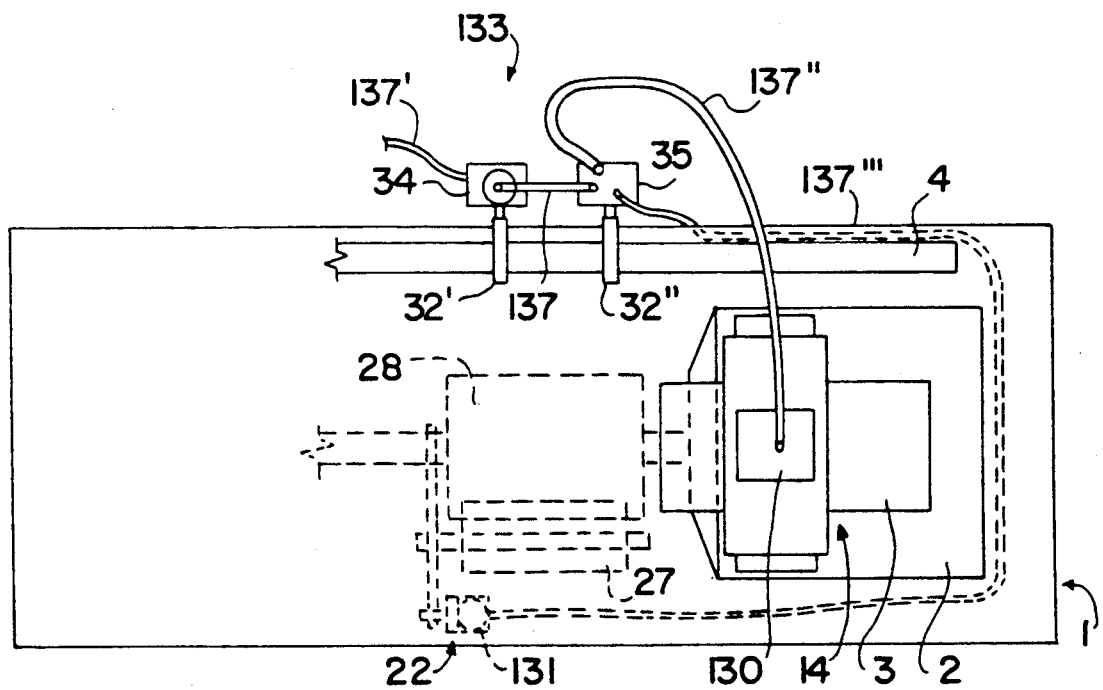
FIG. 10 is a representation of an automatic Swiss screw machine with the stop spindle apparatus installed, illustrating the relationship of the parts of the electrical embodiment.

Air pressure as an operating medium is preferred since it is readily available in machine shops and is easily adapted to this type of use. However, in a still further embodiment as shown in FIG. 10, the entire pressurized air actuation elements, control valve assembly 33, brake actuator 16 or 116, idler release actuator 23 and air tubes 27 may be replaced by electrical switches solenoid units and wires. In such an embodiment, switches 133 in place of control valve assembly 33 are activated by cam 32 and trigger solenoids 180 and in place of pneumatic actuators 16 and 23, the switches 133 and solenoids 130 and 131 being connected via wires 137, 137', 137" and 137'" that follow the path of tubes 37, 37', 37" and 37'". As long as the switches 133 are on, the solenoids 130 and 131 are energized and the respective assemble actuated. At the end of a particular operation, the switches 133 are released, thereby deenergizing the solenoids 130 and 131. As with the pressurized air method of operation, solenoids 130 and 131 working in place of pneumatic actuators 16 and 23 are activated in sequence to release idler pulley 27 before brake 17 or 117 is applied and to release brake 17 or 117 before idler pulley 27 is reengaged.

As previously stated, the apparatus of this invention permits the addition of fast and accurate stop spindle capability to automatic Swiss screw machines for which this option is unavailable. In so doing it allows cross-drilling and similar operations to be performed without removing the workpiece to another machine. Furthermore, such stationary operations may now be performed on these machines between successive rotational operations, thereby permitting greater variation in the types of parts made and greater accuracy in machining. The simple and modular design of the apparatus allows for easy and variable set up on different models of Swiss screw machines, as well as for ease of service. In the event a part requires service, it is not necessary to tear down the Swiss screw machine, unlike the case of those prior machines where the stop spindle mechanism is a built in complex assembly of clutches and bearings. Furthermore, by disconnecting the idler drive and applying a clamping brake directly to the spindle, the apparatus of this invention is able to stop spindle rotation in as little as 5° of arc as opposed of 20° to 30° of arc for the built in types.

The preceding description has presented the preferred embodiments of the present invention, other embodiments and arrangements of elements achieving the same result are deemed to be included herein.

What is claimed is:

1. In an automatic Swiss screw machine comprising an idler belt drive means a longitudinally slidable headstock, a work holding spindle means longitudinally rotatable within said headstock, said drive means comprising pulleys and belts to impart rotation to said spindle means, a tool head and a cam operated control means; the improvement comprising a spindle rotation stopping apparatus comprising:
   an idler pulley release assembly,
   a spindle brake assembly, and
   a cam actuated control assembly,
said apparatus being attached to said automatic Swiss screw machine wherein said idler pulley release assembly is located adjacent said idler belt drive means, said spindle brake assembly is located over said spindle means so as to provide braking contact with said spindle when actuated, and said cam actuated control assembly is located adjacent said cam operated control means for actuation of said spindle rotation stopping apparatus in time with other cam controlled operations of said machine.

2. The apparatus of claim 1, wherein said idler pulley release assembly comprises an actuator, a connection bar having first and second ends, and an idler pivot arm having first and second ends and being pivotally mounted about a point at or adjacent to its longitudinal center; said first end of said connection bar being attached to said actuator, said second end of said connection bar being pivotally attached to said first end of said idler pivot arm and said second end of said idler pivot arm being attached to and carrying an axle of an idler pulley of said idler belt drive means, said assembly engaging and disengaging said idler pulley of said idler belt drive means, thereby engaging and disengaging said drive means.

3. The idler pulley release assembly of claim 2, wherein said actuator comprises a pneumatic cylinder and piston with said connection bar first end attached to said piston wherein longitudinal movement of said piston is transmitted through said connection bar to said idler pivot arm and is converted into angular movement of said idler pulley.

4. The idler pulley release assembly of claim 3, wherein said actuator comprises an electrically operated solenoid comprising a piston and coil, said piston being attached to said connection bar.

5. The apparatus of claim 1, wherein said spindle brake assembly comprises a supporting frame attachable to said headstock over said spindle, an actuator mounted on said frame and a brake engaged with to engage said spindle in response to movement by said actuator.

6. The brake assembly of claim 5, wherein said actuator comprises a pneumatic cylinder and piston, and said brake comprises an arcuate member having friction material on its concave surface, said piston adapted to work against the convex surface of said arcuate member to bring said friction material into contact with said spindle when said brake assembly is actuated, said arcuate member overlying said spindle in conjunction with said frame and having means to bias said brake away from said spindle, said actuator having sufficient force when energized to overcome said brasing means, said frame providing mounting means for said actuator and said brake.

7. The brake assembly of claim 6, wherein said actuator comprises an electrically operated solenoid comprising a coil and piston.

8. In an automatic Swiss screw machine comprising an idler belt drive means, a longitudinally slidable headstock, a work holding spindle means longitudinally rotatable within said headstock, said drive means comprising pulleys and belts to impart rotation to said spindle means, a tool head and a cam operated control means; the improvement comprising:

an idler pulley release assembly located adjacent said idler belt drive means and comprising an actuator, a connection bar attached by one end to said actuator, and a pivotally mounted idler pivot arm pivotally attached at one end to the end of said connection bar opposite said actuator and having at its other end an axle bearing an idler pulley engagable with said idler belt drive means when said idler pulley release assembly is at rest, thereby placing said idler belt drive means under tension so as to cause said spindle to rotate;

a spindle brake assembly comprising a frame attachable to said headstock on either side and spanning said spindle, an actuator attached to said frame and a brake member cooperating with said frame and said actuator to contact said spindle in braking action when urged by said actuator following release of said idler pulley; and a cam actuated control assembly adjacent said cam operated control means for actuation of said idler pulley release assembly and said spindle brake assembly and comprising at least one control element actuated by at least one cam element placed on said cam operated control means, said control element in turn sequentially activating said actuation means on said idler pulley control assembly and said spindle brake assembly to first disengage said idler pulley from said idler belt drive means and second to engage said brake with said spindle thereupon stopping rotation of said spindle, following which a stationary work operation is conducted on a workpiece held in said spindle, then said control assembly is actuated to deactuate said idler pulley release assembly and said spindle brake assembly in reverse sequence, first releasing said brake from said spindle and second reengaging said idler pulley with said idler belt drive means thereby restoring rotation of said spindle.

9. The apparatus of claim 8, wherein actuation of said idler pulley release assembly and said spindle brake assembly are effected by compressed air delivered to said actuators under control of said cam actuated control assembly wherein said control element comprises at least one air valve and said actuators on said idler pulley release assembly and said spindle brake assembly comprise pneumatic cylinders and pistons.

10. The apparatus of claim 8, wherein actuation of said idler pulley release assembly and said spindle brake assembly are effected by electrical means under control of said cam actuated control assembly wherein said control element comprises at least one electrical switch means actuated by said cam and said actuators on said idler pulley release assembly and said spindle brake assembly comprise electromechanical solenoid units.

11. The apparatus of claim 1, wherein said cam actuated control assembly comprises at least one cam placeable on said cam operated control means of said machine, at least one valve member actuated by said cam, air tubing connecting said valve member with said actuators on said idler pulley release assembly and said spindle brake assembly, said actuators comprising pneumatic cylinders, and a source of compressed air, said valve member being mounted in proximity to said cam operated control means of said machine to be actuated at appropriate time intervals by said cam; wherein rotation of said cam to a certain degree actuates said valve member allowing compressed air to flow from said source through said tubing, first to said idler pulley release assembly causing said assembly to disengage said idler pulley from said idler belt drive means, and second to said spindle brake assembly causing said brake to contact said spindle, thereby stopping rotation of said spindle; following a time period that is a function of a design of said cam, said valve member is actuated to cease air flow first to said brake assembly, thereby releasing said brake and second to said idler pulley release assembly, thereby reengaging said idler pulley with said idler belt drive means to reestablish rotation of said spindle.

12. The cam actuated control assembly of claim 11, wherein said valve member comprises two valve elements sequentially actuated by two cams.

13. The apparatus of claim 1, wherein said cam actuated control assembly comprises at least one cam placeable on said cam operated control means of said machine, at least one electrical switch means actuated by said cam and electrical wiring connecting said switch to said actuators of said idler pulley release means and said spindle brake means, said actuators comprising electromechanical solenoid units, said switch means being mounted in proximity to said cam operated control means of said machine to be actuated at appropriate time intervals by said cam; wherein, rotation of said cam to a certain degree actuates said switch, triggering the operation of said solenoid in sequence to operate a first said idler pulley release assembly to disengage said idler pulley from said idler belt drive means and second said spindle brake assembly causing said brake to contact said spindle; following a time period that is a function of a design of said cam, said switch member is deactuated to turn off said solenoids in reverse sequence, first releasing said brake and second reengaging said idler pulley with said idler belt drive means to reestablish rotation of said spindle.

14. The cam actuated control assembly of claim 13, wherein said switch mean comprises two switch elements sequentially actuated by two cams.

* * * * *